Sept. 2, 1947.  A. M. BARRETT  2,426,723
LIFTING TRUCK
Filed Feb. 12, 1945  4 Sheets-Sheet 2
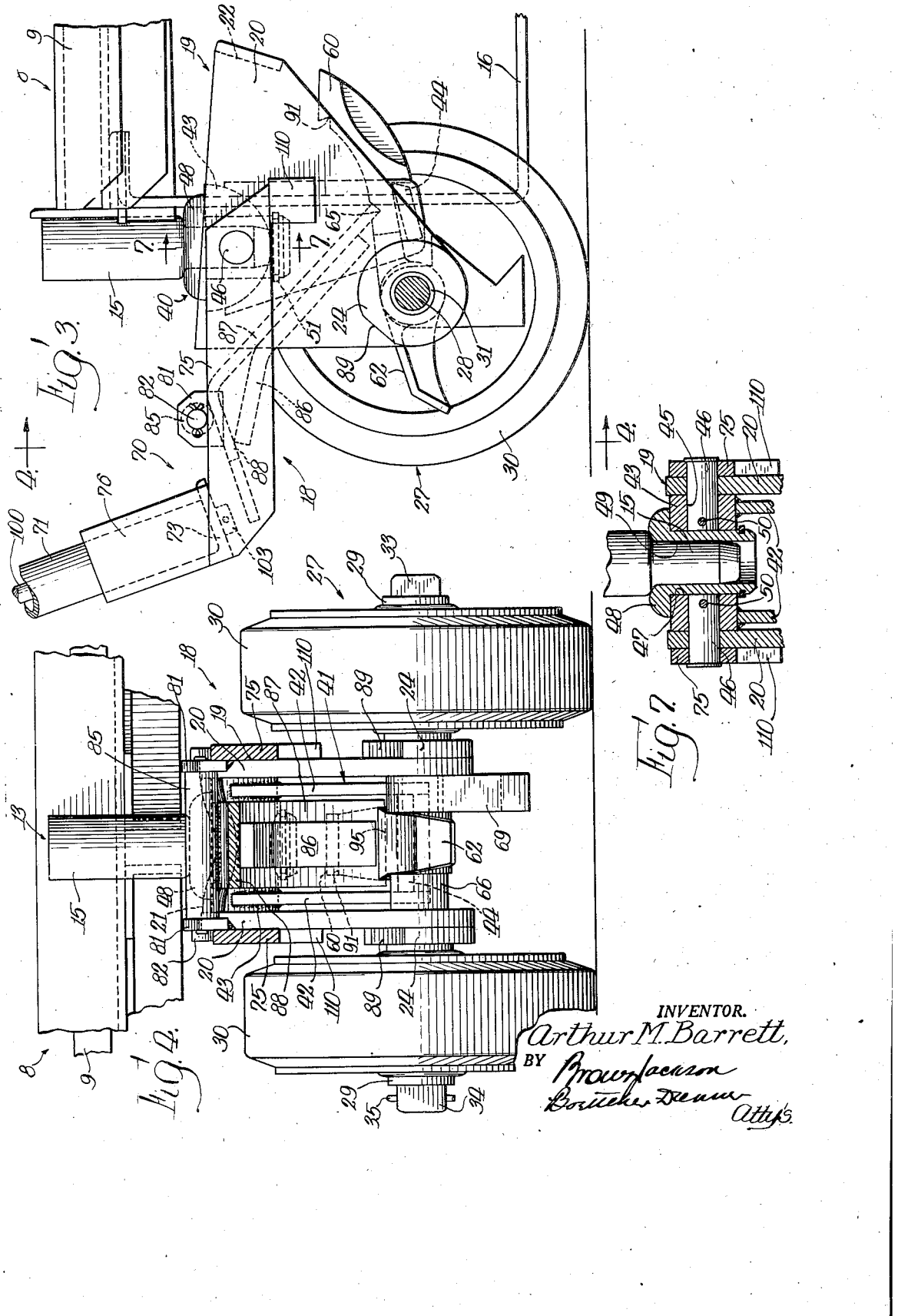
INVENTOR.
Arthur M. Barrett,
BY
Atty's Sept. 2, 1947.  A. M. BARRETT  2,426,723
LIFTING TRUCK
Filed Feb. 12, 1945  4 Sheets-Sheet 3

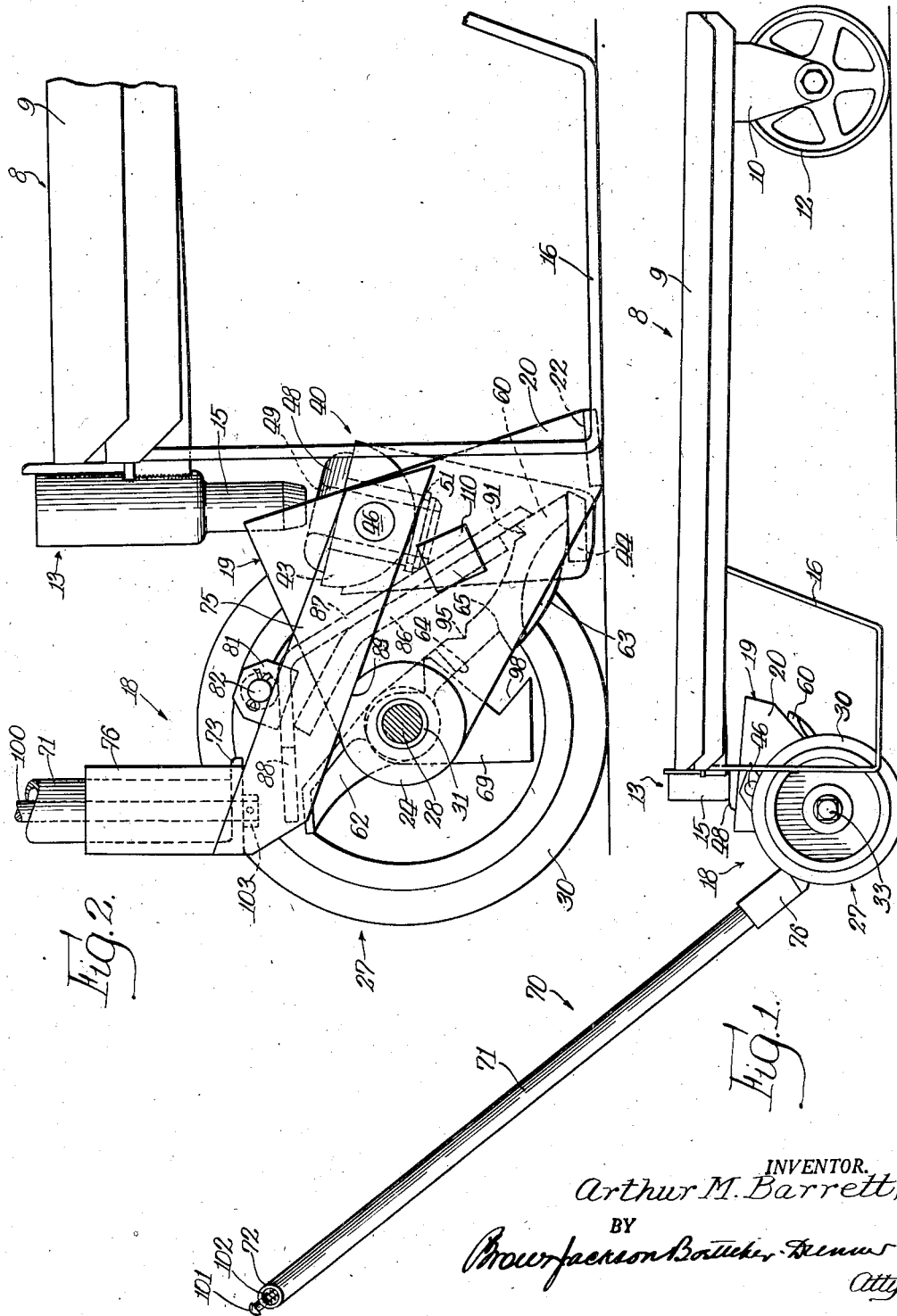

INVENTOR.
Arthur M. Barrett,
BY
Attys.

INVENTOR.
Arthur M. Barrett,

Patented Sept. 2, 1947

2,426,723

UNITED STATES PATENT OFFICE 2,426,723

LIFTING TRUCK

Arthur M. Barrett, Winnetka, Ill., assignor to Barrett-Cravens Company, Chicago, Ill., a corporation of Illinois Application February 12, 1945, Serial No. 577,480

25 Claims. (Cl. 280—46)

1

The present invention relates to an improvement in a truck, and more particularly to a truck of the type for use with a platform having wheels at one end and supporting legs on a stand at the other end, and in which the truck is in the nature of a wheeled jack for engaging and raising the platform off the floor at the supported end thereof for the purpose of moving the platform and load carried thereby from place to place.

It is an object of my invention to provide an improved truck of the above character having a supporting wheel means carrying a frame in which a platform engaging means is pivotally mounted and adapted upon movement of the frame to be brought into engagement with and to raise a platform or the like, and a main latch operable to engage the platform engaging means in its elevated position to prevent pivotal movement of the latter and the frame so that the truck and platform may be wheeled about. The arrangement of the platform engaging means and the main latch avoids the use of springs or special trip mechanisms for actuating the latch mechanism and in the preferred embodiment of my invention the latch is adapted to be actuated by gravity to engage the platform engaging means in the raised position of the latter.

A further important feature of my invention resides in the provision of a handle latch member carried by the handle and serving numerous purposes. The handle latch is operable to effect release of the main latch from the platform engaging means whereby the latter may be lowered from the platform with the load under control of the operator through the handle. Also the handle latch provides for free pivotal movement of the handle in the raised position of the platform engaging means so that the handle may be raised or lowered in moving the truck and the raised platform from place to place without endangering accidental release of the main latch from the platform engaging means. Further, the handle latch in the raised position of the platform engaging means is engageable with the main latch for supporting the handle in a substantially upright position, which is desirable, for example, when the truck and raised platform are to be parked. The arrangement of the handle latch and main latch herein disclosed provides for use of a convenient release means carried by the handle which is operable in the lowermost position of the handle to engage the handle latch and free the main latch of the platform engaging means to effect lowering of the latter. The handle latch is further effective to prevent pivotal movement

2 of the handle about its pivot when the truck is removed from the platform so that the handle cannot be swung independently of pivotal movement of the frame and associated mechanism about the axle providing for convenient storing and handling of the truck.

A further preferred feature of my invention resides in the provision of a side latch carried on the axle of the truck for preventing engagement of the main latch with the platform engaging means except in the raised position of the latter. This feature prevents the main latch and platform engaging means from engaging in instances such as when the platform engaging means may strike the platform bringing it into position to be engaged by the main latch, which if it was permitted to occur, would interfere with the proper operation of the device in raising the platform.

Further objects and advantages of my invention will appear from the detailed description.

Now in order to acquaint those skilled in the art with the manner of constructing and using a truck in accordance with the principles of my present invention, I shall describe in conjunction with the accompanying drawings a preferred embodiment of the invention.

In the drawings:

Figure 1 is a side view of the truck of my present invention showing the manner in which it is used in supporting one end of a platform having wheels at one end thereof and supporting legs at the other end with the supporting legs out of contact with the floor so that the truck and platform may be moved from place to place;

Figure 2 is an enlarged side view of the truck with one of the pair of wheels thereof removed and part of the handle broken away, and the forward portion of a platform with the truck disposed in a position to engage the platform for raising the latter, the position of the truck as shown in this figure also being in the position it may occupy when it is to be stored or when not in use;

Figure 3 is a side view similar to Figure 2, but showing the position of the parts of the truck when engaged with and supporting the platform and showing the manner in which the handle may be supported in an upright position when the truck and platform are parked;

Figure 4 is an end view of the forward end of the truck taken substantially on line 4—4 of Figure 3 looking in the direction indicated by the arrows;

Figure 7 is a vertical sectional view taken substantially on line 7—7 of Figure 3, looking in the direction indicated by the arrows;

Figure 6:
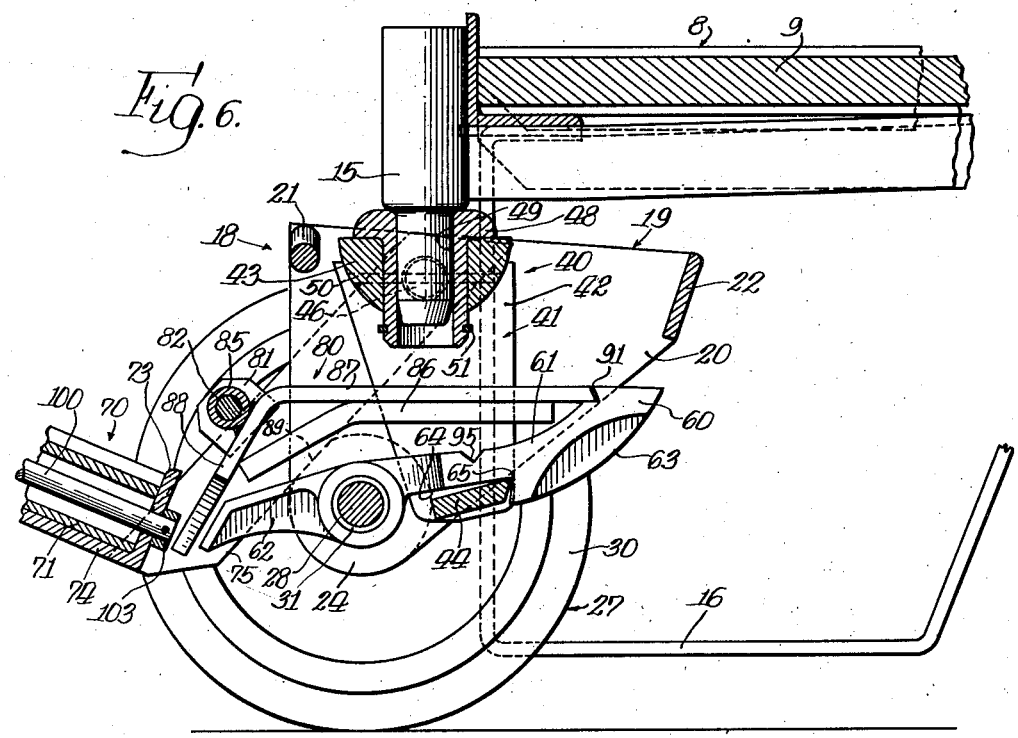
Figure 6 is a central vertical sectional view taken substantially on line 6—6 of Figure 5, looking in the direction indicated by the arrows with certain parts of the platform being shown in elevation.
Figure 5:
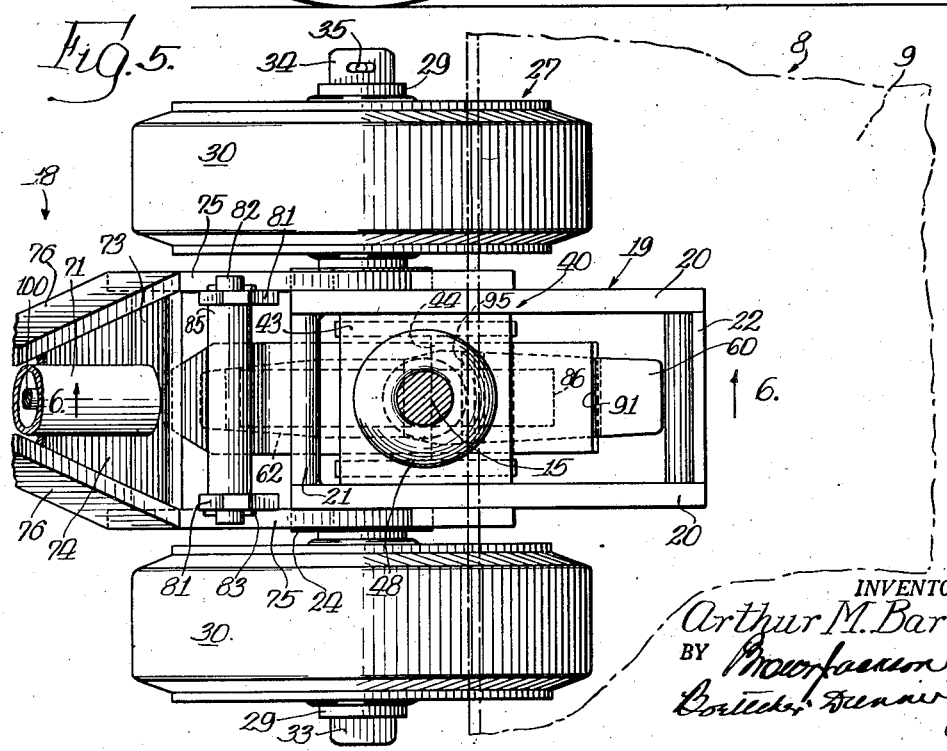
Figure 5 is a plan view of the truck in the position shown in Figure 6, a portion of the platform in this figure being indicated in dot-dash lines.

In Figure 1 there is shown a platform 8 of known construction and of a type with which the truck of my invention may be used. The truck 8 has a floor 9 formed in any suitable manner of wooden flooring or the like reinforced and connected together by angle iron members or other suitable framing members. The platform 8 at its rear end carries a bracket 10 supporting an axle upon which a pair of wheels 12, only one of which is shown in the drawings, are journaled. It will be understood, however, that at least a pair of wheels 12 are used with one wheel being disposed adjacent each side of the platform 8. At its other or forward end, the platform 8 has a bracket 13 secured in any suitable manner to the platform and having a stud or pin 15 which is adapted to be engaged by the truck of the present invention in raising the legs 16, only one of which is shown, of the platform off of the floor. The stud or pin 15 is permanently welded to the bracket centrally of the forward edge of the platform so as to be a permanent part of the platform. The front legs 16 may be formed of any suitable strap iron and may be firmly secured to the platform one each along the sides forwardly thereof by welding of the ends to the reinforcing members of the platform 8 or may be bolted thereto, as desired. Platforms of the character above described are well known in the art and it is thought that the above description will suffice for purposes of the present invention which resides in the truck for engaging and raising the leg supported end of a platform such as that shown in the drawings.

Referring now to Figures 2 to 6 it will be observed that the truck 18 comprises a frame 19 formed by a pair of side walls 20 spaced apart and connected together at their forward upper ends by a cross bar 21, the opposite ends of which are welded to the side plates 20, and by a plate member 22 at the inner or rearward ends thereof, the opposite ends of which are also welded to the plate members 20. A pair of collars 24 are welded one each to the outer faces of the plate members 20 at the lower forward portions thereof. The frame 19 is carried by the supporting wheel means 27 which comprises an axle 28 carrying bushings 29 at its opposite ends upon which a pair of wheels 30 are journaled. The wheels 30 are of known construction and may, if desired, be provided with rubber tires of substantial width to provide load supporting surfaces of substantial area. A bushing 31 is carried by the axle 28 and extends between the inner ends of bushing members 29 for each of the wheels and the side walls 20 and collars 24 are supported on the axle by this bushing. The axle 28 shown in the present embodiment comprises a bolt having a head 33 at one end thereof and a nut 34 at the other end with a cotter pin 35 extending through a hole in the nut and the axle for retaining the several parts described in assembled relation on the axle.

A platform engaging means 40 comprises a saddle assembly 41 formed by a pair of spaced side plates or panels 42 which are welded at their upper ends to a trunnion seat member 43 and at their lower ends to a catch member 44. As more clearly shown in Figures 6 and 7 the trunnion seat 43 is substantially semi-circular in cross-section and is formed with a bore 45 the axis of which is substantially parallel with the axis of the axle and into which a pair of trunnion studs 46 extend through side walls 20 of the frame providing for pivotal mounting of the saddle assembly 40. A bore 47 extends at right angles to the bore 45 in the trunnion seat member 43 and rotatably supports a trunnion member 48. The trunnion member 48 is provided with a bore 49 for receiving the reduced lower end of pin 15 carried by the platform 8. A pair of pins 50 extend through the trunnion seat member 43 at either side of the bore 47 for the trunnion 48 and through trunnion studs 46 for retaining the parts in assembled relation. Also the lower end of the trunnion member 48 has a groove therein for receiving the snap ring 51 for preventing displacement of the trunnion member 48 from the trunnion seat member 43. A main latch member 60 is pivotally mounted intermediate its ends on the bushing 31 carried by the axle 28 centrally thereof. The rearward arm 61 thereof is of greater length and weight than the forward arm 62 so that it normally tends to rotate about the bushing and axle in a clockwise direction as viewed in the several side views of the drawings. The lower edge 63 of the rearward arm 61 of the main latch 60 is arcuate and the arm 61 extends between the side panels 42 of the trunnion seat member 43. A recess 64 is formed in the main latch member between the forward end of the arcuate edge 63 and its pivotal mounting which provides for engagement of the main latch member 60 with the catch member 44 of the platform engaging means 40. The upper rearward edge 65 of the catch member 44 and the rearward upper corner of the recess 64 are formed so as to provide substantially line contact to prevent frictional binding of the main latch with the catch member of the saddle assembly when they are to be disengaged in a manner to be described hereinafter. It will be observed that the main latch 60 is disposed substantially centrally of the axle and the rearward arm 61 thereof, as above noted, extending between the side plates 42 of the saddle assembly, and the main latch member 60 is retained in its central position by a spacing collar 66 disposed between it and one side plate member 20 of the frame 19 and by a side latch member 69 disposed between the main latch member 60 and the other side plate 20 of the main frame. The purpose of the side latch member 69 will be referred to in greater detail hereinafter.

Reference may now be had to Figures 1, 3, 5 and 6 for a description of the handle means 70 of the truck. The handle assembly 70 comprises a tubular handle bar 71 having a handle grip member 72 welded at right angles to its outer end. The tubular handle bar 71 at its lower end is welded to a flange 73 of an angle iron member 74 of substantially triangular configuration in plan. A pair of reinforcing frame members 76 are welded to the angle member 74 and extend diagonally toward the tubular handle bar 71 from the forward end of the fork arms 75 and are welded thereto and to said tubular member thus providing a rigid connection between the tubular member 71 and the fork arms 75. The fork arms 75 at their rearward or inner ends are pivotally mounted on the trunnion studs 46 providing a pivotal mounting of the handle assembly 70 about the axis of these studs. As shown in Figure 7 studs 46 are formed with enlarged head portions for retaining the handle assembly 70 in assembled position with the frame 19 of the truck. A handle latch 80 is pivotally mounted intermediate its ends on the fork arms 75 and above the main latch member 60 by means of a pair of latch supporting lugs 81 welded to the fork arms 75 which receive the opposite ends of a pin 82 having cotter keys 83 at its outer ends. The handle latch 80 has welded thereto a bushing 85 through which the pin 82 extends providing for the pivotal mounting of the handle latch 80. A latch brace 86 is welded to the under surface of the handle latch 80. It will be observed that the rearward arm portion 87 of the handle latch 80 is of a greater length and weight than the forward arm portion 88 thereof forwardly of the pivotal mounting and it is therefore normally urged to rotate in a clockwise direction about the pin 82.

The operation of the device as thus far described is as follows:

When it is desired to raise and lift a platform, such as the platform 8 to move it to another place, the truck 18 is wheeled to the position shown in Figure 2 of the drawing so that the trunnion member 48 is positioned with the bore 49 thereof immediately below the pin 15. In this position the tubular member 71 of the handle is in a substantially vertical position and the fork arms 75 are in engagement with straight line portions 89 formed on the collars 24, and upon swinging movement of the handle assembly 70 in a counterclockwise direction the frame 19 will be rotated in a counterclockwise direction bringing the trunnion 48 into engagement with pin 15 of the platform 8. The rearward arm 61 of the main latch 60 slides between the side walls 42 of the saddle assembly 41 with the arcuate edge 63 thereof in contact with the upper surface of the catch member 44. The parts are so designed that in this position the arcuate edge 63 has its center substantially on the axis of the stud pins 46 so that upon swinging movement of the frame 19 in the aforesaid counter-clockwise direction, the saddle assembly 40 rotates about the axis of the studs 46 thereby rotating the main latch member 60 in a counterclockwise direction. When the handle assembly is rotated to bring the frame 19 to the position shown in Figure 6, it will be observed that as the catch member 44 leaves the arcuate edge 63 the main latch 60 is rotated slightly in a clockwise direction by gravity as permitted by the recess 64, whereby the main latch 60 becomes engaged with the catch member 44 to maintain the frame 19 and platform engaging means 40 comprising the saddle assembly 41 and the trunnion member 48 in the position shown in Figure 6. In this position of the parts the supporting legs 16 of the platform are raised off the floor and the truck and platform may now be freely moved about, as desired.

It will also be observed that as the handle assembly 70 is rotated in the counter-clockwise direction to engage the platform engaging means 40 with the platform that as the main latch member 60 engages the catch member 44 the handle latch 80 rotates slightly in a clockwise direction as permitted by the notch 91 formed in the upper rear end of arm 63 of the main latch 60, whereby the handle latch 80 assumes the position shown in Figure 6. The handle assembly 70 in this position of the parts may now be raised and lowered about the pivotal mounting of the fork arms 75 in the studs 46 for facilitating movement of the truck and platform as desired by the operator without effecting disengagement of the main latch member 60 with the catch member 44. The upper surface of the arm 61 of the main latch member slightly rearwardly of its pivotal mounting on the axle is provided with a notch 95 for receiving the end of arm 87 of the handle latch 80 as shown in Figure 3 for supporting the handle in a substantially upright position. Supporting of the handle in this position is desirable when for example it is desired to park the platform 8 and the truck without removing the truck from the platform.

The arrangement of the several parts of the truck provides for its convenient storing when not in use in the position of the truck as shown in Figure 2. It will be observed that the arrangement of the parts is such that the frame member 22 extending between the side plates 20 of the frame provides a convenient support engageable with the floor to support the tubular handle bar 71 in substantially vertical position. In this position of the parts, the handle may be raised and lowered without effecting engagement of the main latch member 60 with the catch member 44, and clockwise rotation of the handle means 70 beyond the vertical position is prevented by the rearward arm 87 of the handle latch 80 and being confined between the inner end of the trunnion member 44 and the rearward or inner end of arm 61 of main latch member 60.

Figure 9:
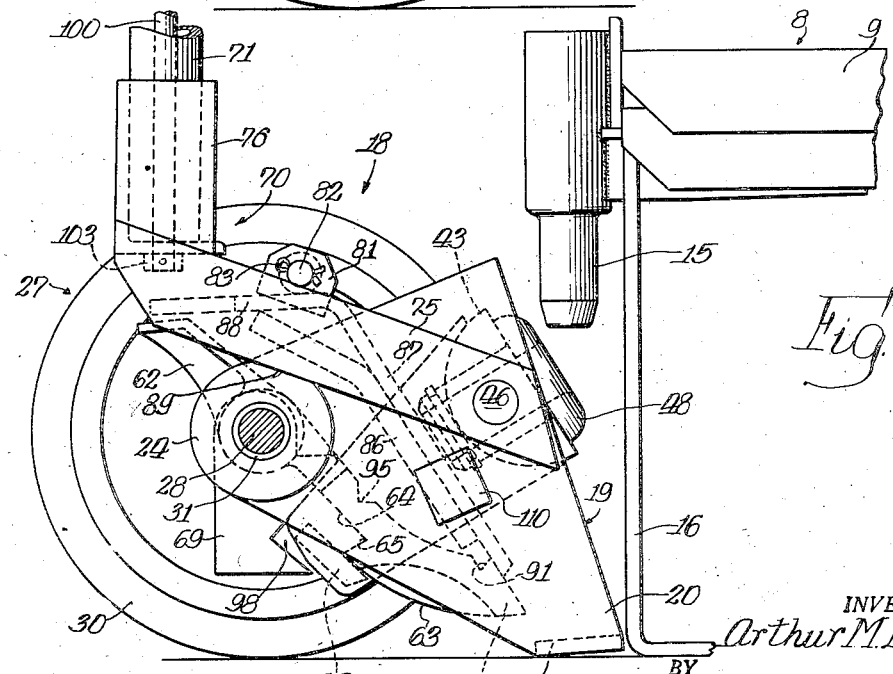
Figure 9 is a side view similar to Figure 2 showing the means for preventing engagement of the main latch with the platform engaging means in the lowered position of the latter.

The side latch member 69 previously referred to is freely pivoted on the bushing 31 carried by the axle 28 and as shown in Figure 9 it has a notch 98 therein opening rearwardly. The side latch member 69 is designed so that it will always depend downwardly as shown in the several figures of the drawings regardless of the position of the fame 19 and the platform engaging means 40. The main purpose of the side latch member 69 is for preventing engagement of the catch member 44 of the platform engaging means with the main latch member 60 when the frame and platform engaging means are in their lowered positions. This is illustrated in Figure 9 in which the platform engaging means is shown in a position which it may be caused to assume in positioning of the truck to raise a platform in which the platform engaging means in accidental striking of the platform may be caused to rotate in a clockwise direction about its pivot. However, the forward edge of one side plate 42 of the platform engaging means is in alignment with the notch 98 of the side latch member 69 and the latter prevents pivotal movement of the platform engaging means to a position in which the catch member 44 may be engaged by the main latch 60.

Figure 8:
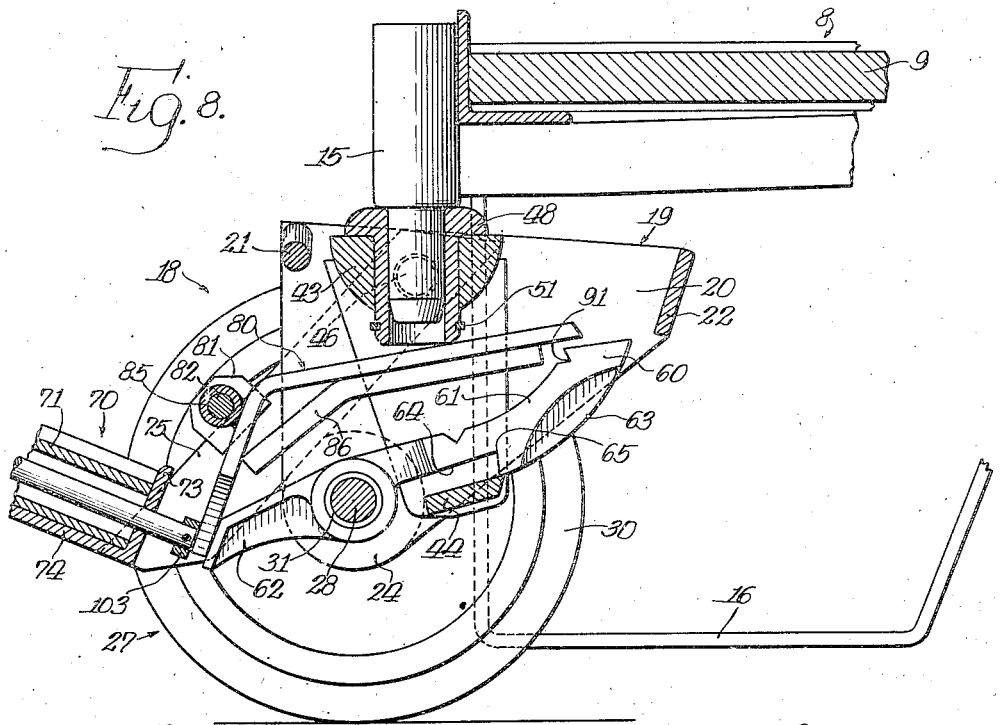
Figure 8 is a central vertical sectional view similar to Figure 6 but showing the position of the parts when the truck is to be removed from the platform.

Suitable release mechanism for disengaging the main latch member and the catch member is provided, and in the preferred form of my invention this release mechanism comprises a rod 100 extending through the tubular member 71 of the handle assembly 70 having a push button 101 formed on its outer end and extending beyond the handle grip bar 72, with a spring 102 surrounding a portion of the rod for normally urging the rod in a direction outwardly of the handle grip bar 72. The opposite end of the rod 100 has a ring member 103 secured thereto limiting outward movement of the rod 100 by the spring 102 which ring 103 bears against the outer surface of the flange 73. Now in order to lower the frame 18 and the platform engaging means 40 from the pin 15 of the platform 8, the handle means 70 is brought to the position shown in Figure 8 in which the fork arm 75 rests against the straight line portions of collars 24 carried by the side plates 20 of the frame. When in this position the button 101 may be depressed forcing the rod 100 downwardly within the tubular handle bar 71 to engage the other end thereof with the arm 88 of the handle latch 80 rotating it in a counterclockwise direction about its pivot 82 and causing engagement of the end portion of arm 88 with the forward end of arm 62 of the main latch 60 also causing the main latch member 60 to rotate in a counter-clockwise direction raising the latch member clear of the catch member 44. This position of the parts is shown in Figure 8. The handle may now be rotated in a clockwise direction to swing the frame 18 toward its lowered position and lowering the platform engaging means 40 from the pin 15 whereby the legs 16 will engage the floor, and continued rotation of the handle thereafter lowering the platform engaging means and the trunnion 48 thereof away from the pin 15 until the parts again assume the position shown in Figure 2, in which position the truck may be wheeled away from the frame. It will be noted that in lowering of the frame the platform and the load carried thereby are under the control of the operator through the handle.

The release mechanism above described is also effective for releasing the handle from its substantially upright position as shown in Figure 3. Actuation of the rod 100 by depressing button 101 in this position of the parts will cause the inner end of the rod to engage the end of arm 88 of the handle latch 80 rotating the latter in a counterclockwise direction about its pivotal mounting on the pin 82 freeing the outer end of arm 87 from notch 95 of the main latch member 60. Also, a pair of lugs 110, one of which is shown in Figure 3, are welded to the outer surfaces of the side plates 20 of the frame in a position to be engaged by the free ends of the fork arm 75 to limit clockwise rotation of the handle means 70 beyond the position shown in Figure 3 when the platform engaging means and the main latch member are engaged in supporting the platform 8 in its raised position.

While I have shown what I consider to be the preferred embodiment of my invention it will be understood that various rearrangements and modifications may be made therein without departing from the spirit and scope of my invention.

I claim:

1. A truck of the class described comprising supporting wheel means, a frame carried thereon, a platform engaging means pivotally mounted on said frame, handle means connected to said frame for rotating the same in one direction to raise said platform engaging means into engagement with and to raise a platform or the like, and a latch member pivotally mounted on said supporting wheel means adapted to be rotated by gravity in a direction opposite to the direction of rotation of said frame to engage said platform engaging means when the latter is disposed in its raised position for preventing pivotal movement thereof and of said frame.

2. A truck of the class described comprising, supporting wheel means, a frame carried thereon, a platform engaging means pivotally mounted on said frame, handle means connected to said frame for rotating the same in one direction to raise said platform engaging means into engagement with and to raise a platform or the like, a latch member pivotally mounted on said supporting wheel means adapted to be rotated by gravity in a direction opposite to the direction of rotation of said frame to engage said platform engaging means when the latter is disposed in its raised position for preventing pivotal movement thereof and of said frame, and means carried by said handle means for disengaging said latch member from said platform engaging means.

3. A truck of the class described comprising, supporting wheel means, a frame carried thereon, a platform engaging means pivotally mounted on said frame, handle means connected to said frame for rotating the same in one direction to raise said platform engaging means into engagement with and to raise a platform or the like, a latch member pivotally mounted on said supporting wheel means adapted to be rotated by gravity in a direction opposite to the direction of rotation of said frame to engage said platform engaging means when the latter is disposed in its raised position for preventing pivotal movement thereof and of said frame, means carried by said handle means for disengaging said latch member from said platform engaging means, and means carried by said supporting wheel means to prevent engagement of said latch member and said platform engaging means in the lowered position of the latter.

4. A truck of the class described comprising, supporting wheel means, a frame carried thereon, a platform engaging means pivotally mounted on said frame, handle means connected to said frame for rotating the same in one direction to raise said platform engaging means into engagement with and to raise a platform or the like, a latch member carried by said supporting wheel means adapted to be rotated by gravity in a direction opposite to the direction of rotation of said frame to engage said platform engaging means when the latter is disposed in its raised position for preventing pivotal movement thereof and of said frame, means carried by said handle means for disengaging said latch member from said platform engaging means, whereby said frame may be rotated under control of said handle means to lower said platform engaging means from the platform, and means carried by said supporting wheel means to prevent engagement of said latch member and said platform engaging means in the lowered position of the latter.

5. A truck of the class described comprising, supporting wheel means, a frame carried thereon, a platform engaging means pivotally mounted on said frame, handle means connected to said frame for rotating the same to raise said platform engaging means into engagement with and to raise a platform or the like, a main latch member carried by said supporting wheel means for engaging said platform engaging means in the raised position of the latter preventing movement thereof and of said frame, and a handle latch pivoted on said handle means engageable with said main latch member in the raised position of said platform engaging means for supporting said handle in a substantially upright position.

6. A truck of the class described comprising, supporting wheel means, a frame carried thereon, a platform engaging means pivotally mounted on said frame, handle means pivoted on said frame and engageable therewith for rotating the same in one direction to raise said platform engaging means into engagement with and to raise a platform or the like, a main latch member pivotally mounted on said supporting wheel means and rotatable by gravity in a direction opposite the direction of rotation of said frame and engaging said platform engaging means in the raised position of the latter, and a handle latch pivoted on said handle means for preventing pivotal movement of said handle means about its pivot in the disengaged positions of said platform engaging means and said main latch member.

7. A truck of the class described comprising supporting wheel means, a frame carried thereon, a platform engaging means pivotally mounted on said frame, a handle pivoted to said frame and engageable therewith for rotating the same to raise said platform engaging means into engagement with and to raise a platform or the like, a main latch member pivoted on said supporting wheel means for engaging said platform engaging means in the raised position of the latter, a handle latch pivoted on said handle means for preventing pivotal movement of said handle means about its pivot in the disengaged positions of said platform engaging means and said main latch member, and means carried by said supporting wheel means to prevent engagement of said latch member and said platform engaging means in the lowered position of the latter.

8. A truck of the class described comprising, supporting wheel means, a frame carried thereon, a platform engaging means pivotally mounted on said frame, handle means pivoted to said frame and engageable therewith for rotating the same to raise said platform engaging means into engagement with and to raise a platform or the like, a main latch member carried by said supporting wheel means for engaging said platform engaging means in the raised position of the latter, and means including a handle latch pivoted on said handle means above said main latch member, for engaging said main latch to disengage the latter from said platform engaging means in the raised position of the latter.

9. A truck of the class described comprising, supporting wheel means, a frame carried thereon, a platform engaging means pivotally mounted on said frame, handle means pivoted on said frame and engageable therewith for rotating the same to raise said platform engaging means into engagement with and to raise a platform or the like, a main latch member pivotally mounted intermediate its ends on said supporting wheel means with one of said ends contacting the platform engaging means in the lowered position of the latter, said main latch member being positionable by said platform engaging means to engage the same in the raised position of the latter, and a handle latch pivoted intermediate its ends on said handle means above said main latch and arranged so that one end thereof is adapted to engage said one end of said main latch member and said platform engaging means to prevent pivotal movement of said handle means about its pivot in the disengaged positions of said platform engaging means and said main latch member, said handle means in the engaged position of said main latch member and said platform engaging means being movable about its pivot.

10. A truck of the class described comprising, supporting wheel means, a frame carried thereon, a platform engaging means pivotally mounted on said frame, handle means pivoted to said frame and engageable therewith for rotating the same to raise said platform engaging means into engagement with and to raise a platform or the like, a main latch member pivotally mounted intermediate its ends on said supporting wheel means with one of said ends contacting said platform engaging means in the lowered position said main latch being positionable by said platform engaging means to engage the same in the raise position of the latter, a handle latch pivoted intermediate its ends on said handle means above said main latch member and arranged so that one end thereof engages said one end of said main latch member and said platform engaging means to prevent pivotal movement of said handle means about its pivot in the disengaged positions of said platform engaging means and said main latch member, said handle means in the engaged position of said main latch member and said platform engaging means being movable about its pivot, and means carried by said handle means for moving the other end of said handle latch into engagement with the other end of said main latch member to release the same from said platform engaging means in the raised position of the latter.

11. A truck of the class described comprising, supporting wheel means, a frame carried thereon, a platform engaging means pivotally mounted on said frame, handle means pivoted on said frame and engageable therewith for rotating the same to raise said platform engaging means into engagement with and to raise a platform or the like, a main latch member pivotally mounted intermediate its ends on said supporting wheel means with one of said ends contacting the platform engaging means in the lowered position of the latter, said main latch member being positionable by said platform engaging means to engage the same in the raised position of the latter, and a handle latch pivoted intermediate its ends on said handle means above said main latch and arranged so that one end thereof is adapted to engage said one end of said main latch member and said platform engaging means to prevent pivotal movement of said handle means about its pivot in the disengaged position of said platform engaging means and said main latch member, said handle means in the engaged position of said main latch member and said platform engaging means being movable about its pivot, and means on said wheel supporting means for preventing engagement of said platform engaging means with said main latch lever in the lowered position of said platform engaging means.

12. A truck of the class described comprising, supporting wheel means, a frame carried thereon, a platform engaging means pivotally mounted on said frame, handle means pivoted to said frame and engageable therewith for rotating the same to raise said platform engaging means into engagement with and to raise a platform or the like, a main latch member pivotally mounted intermediate its ends on said supporting wheel means with one of said ends contacting said platform engaging means in the lowered position said main latch being positionable by said platform engaging means to engage the same in the raised position of the latter, a handle latch pivoted intermediate its ends on said handle means above said main latch member and arranged so that one end thereof engages said one end of said main latch member and said platform engaging means to prevent pivotal movement of said handle means about its pivot in the disengaged positions of said platform engaging means and said main latch member, said handle means in the engaged position of said main latch member and said platform engaging means being movable about its pivot, means carried by said handle means for moving the other end of said handle latch into engagement with the other end of said main latch member to release the same from said platform engaging means in the raised position of the latter, and means on said wheel supporting means for preventing engagement of said platform engaging means with said main latch lever in the lowered position of said platform engaging means.

13. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends on said axle with one end thereof contacting said platform engaging means in the lowered position of the same and positionable thereby in its raised position to engage said catch member to prevent pivotal movement of said platform engaging means about its axis and of said frame about the axis of said axle.

14. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends on said axle with one end thereof contacting said platform engaging means in the lowered position of the same and positionable thereby in its raised position to engage said catch member to prevent pivotal movement of said platform engaging means about its axis and of said frame about the axis of said axle, and means carried by said handle means for engaging the other end of said main latch member to disengage it from said catch member whereby said frame may be rotated under control of said handle means to lower said platform engaging means from the platform.

15. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends on said axle with one end thereof contacting said platform engaging means in the lowered position of the same and positionable thereby in its raised position to engage said catch member to prevent pivotal movement of said platform engaging means about its axis and of said frame about the axis of said axle, and a handle latch pivoted intermediate its ends on said handle means and disposed above said main latch member, one end of said handle latch being adapted to bear against said main latch member and said platform engaging means in the lowered position of the latter to prevent pivotal movement of said handle means about its pivot, said one end of said handle latch being free of said platform engaging means and said main latch member in their engaged position providing for pivotal movement of said handle means about its pivot.

16. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends about the axis of said axle with one end thereof contacting said platform engaging means in the lowered position of the same and positionable thereby in its raised position to engage said catch member to prevent pivotal movement of said platform engaging means about its axis and of said frame about the axis of said axle, a handle latch pivoted intermediate its ends on said handle means and disposed above said latch member, one end of said handle latch being adapted to bear against said main latch member and platform engaging means in the lowered position of the latter to prevent pivotal movement of said handle means about its pivot, said one end of said handle latch being free of said platform engaging means and said main latch member in their engaged position providing for pivotal movement of said handle means about its pivot, and there being a detent in said main latch member for receiving said one end of said handle latch member to support said handle in a substantially upright position.

17. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends about the axis of said axle with one end thereof contacting said platform engaging means in the lowered position of the same and positionable thereby in its raised position to engage said catch member to prevent pivotal movement of said platform engaging means about its axis and of said frame about the axis of said axle, a handle latch pivoted intermediate its ends on said handle means and disposed above said latch member, one end of said handle latch being adapted to bear against said main latch member and platform engaging means in the lowered position of the latter to prevent pivotal movement of said handle means about its pivot, said one end of said handle latch being free of said platform engaging means and said main latch member in their engaged position providing for pivotal movement of said handle means about its pivot, and there being a detent in said main latch member for receiving said one end of said handle latch member to support said handle in a substantially upright position and means carried by said handle means for engaging the other end of said handle latch member to rock the same about its pivot to release said one end thereof from the detent of said main latch member.

18. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends about the axis of said axle with one end thereof contacting said platform engaging means in the lowered position of the same and positionable thereby in its raised position to engage said catch member to prevent pivotal movement of said platform engaging means about its axis and of said frame about the axis of said axle, a handle latch pivoted intermediate its ends on said handle means and disposed above said latch member, one end of said handle latch being adapted to bear against said main latch member and platform engaging means in the lowered position of the latter to prevent pivotal movement of said handle means about its pivot, said one end of said handle latch being free of said platform engaging means and said main latch member in their engaged position providing for pivotal movement of said handle means about its pivot, and there being a detent in said main latch member for receiving said one end of said handle latch member to support said handle in a substantially upright position and means carried by said handle for engaging the other end of said handle latch lever to rock the same about its pivot to release said one end thereof from the detent of said main latch lever, and in the lowered position of said handle means to engage the other end of said handle latch member to rock the same about its pivot into engagement with the other end of said main latch member to disengage it from said catch member whereby said frame may be rotated under control of said handle means to lower said platform engaging means from the platform.

19. In a device of the class described, an axle having a pair of wheels mounted thereon, a frame mounted on said axle between said wheels, a platform engaging means pivotally mounted on said frame about an axis parallel to the axis of said axle and having a catch member, handle means pivoted on said frame and engageable therewith for swinging said frame about the axis of said axle to raise said platform engaging means into engagement with and to raise a platform or the like, a main latch member pivoted intermediate its ends on said axle with one arm thereof contacting said platform engaging means in the lowered position of the same and positionable thereby in its raised position to engage said catch member to prevent pivotal movement of said platform engaging means about its axis and of said frame about the axis of said axle, and a side latch member pivoted on said axle adapted to engage said platform engaging means to prevent engagement of said main latch member and said catch member in the lowered position of said platform engaging means.

20. In a device of the class described, comprising an axle having a pair of wheels mounted thereon, a frame having a pair of side walls carried on said axle between said wheels, a platform engaging means having a pair of side walls disposed between said side walls of said frame and pivoted at their upper ends thereto, said platform engaging means having a catch member extending between its side walls at the lower ends thereof, handle means comprising a tubular handle bar and a pair of fork arms the latter being pivotally connected to said frame on the axis of said platform engaging means and being engageable in one direction of movement of said handle means with said frame for rotating the latter about the axis of said axle to raise said platform engaging means into engagement with and to raise a platform or the like, a main latch member pivoted intermediate its ends about the axis of said axle, one arm thereof contacting said catch member in the lowered position of said platform engaging means and positionable thereby in its raised position to engage said catch member to prevent pivotal movement of said platform engaging means about its axis and of said frame about the axis of said axle, a handle latch pivoted intermediate its ends on said handle means between the fork arms thereof and above said main latch member, said handle latch being formed so that one arm thereof is engageable with said one arm of said main latch member and said platform engaging means to prevent pivotal movement in the other direction of said handle means about its pivot in the disengaged position of said platform engaging means and said main latch member, said one arm of said handle latch being free of said platform engaging means and said main latch member in their engaged position providing for pivotal movement of said handle means about its pivot, and a rod extending through the tubular handle bar of said handle means for engaging the other arm of said handle latch member to rock the same about its pivot into engagement with the other arm of said main latch member to rock the latter about its pivot and to disengage it from said catch member whereby said frame may be rotated under control of said handle means to lower the platform engaging means from the platform.

21. In a truck of the class described having supporting wheel means, a frame carried by said supporting wheel means, and handle means connected to said frame for rotating the same, the combination therewith of platform engaging means pivotally mounted on said frame and adapted to be positioned in its operative position of engaging and raising a platform or the like by rotation of said frame in one direction, and a latch member pivotally mounted on said supporting wheel means adapted when said platform engaging means is raised to its operative position to be rotated by gravity in a direction opposite the direction of rotation of said frame in raising said platform engaging means to its operative position to engage said platform engaging means and prevent pivotal movement thereof and of said frame.

22. In a truck of the class described having supporting wheel means, a frame carried by said supporting wheel means, and handle means connected to said frame for rotating the same, the combination therewith of platform engaging means pivotally mounted on said frame and comprising a pair of spaced side plates having a catch member extending transversely thereof, said platform engaging means being adapted to be positioned in an operative position of engaging and raising a platform or the like by rotation of said frame in one direction, and a latch member pivoted on said supporting wheel means lying between the side walls of said platform engaging means and being formed with a notch adapted to engage the catch member of said platform engaging means in the operative position of the latter, said latch member being adapted to be rotated by gravity in a direction opposite the direction of rotation of said frame in raising said platform engaging means to its operative position to engage the notch of said latch member with said catch member of said platform engaging means.

23. In a truck of the class described having supporting wheel means, a frame carried by said supporting wheel means, and handle means connected to said frame for rotating the same, the combination therewith of platform engaging means pivotally mounted on said frame and comprising a pair of space side plates having a catch member extending transversely thereof, said platform engaging means being adapted to be positioned in an operative position of engaging and raising a platform or the like by rotation of said frame in one direction, a latch member pivoted on said supporting wheel means lying between the side walls of said platform engaging means and being formed with a notch adapted to engage the catch member of said platform engaging means in the operative position of the latter, said latch member being adapted to be rotated by gravity in a direction opposite the direction of rotation of said frame in raising said platform engaging means to its operative position to engage the notch of said latch member with said catch member of said platform engaging means, and second latch means on said wheel supporting means for preventing engagement of said main latch member and said platform engaging means in the lowered position of the latter.

24. In a truck of the class described having supporting wheel means, a frame carried by said supporting wheel means, and handle means connected to said frame for rotating the same, the combination therewith of platform engaging means pivotally mounted on said frame and adapted to be positioned in an operative position of engaging and raising a platform or the like by rotation of said frame by manipulation of said handle means, main latch means pivotally mounted on said wheel supporting means adapted to engage said platform engaging means in its operative position to prevent pivotal movement of the latter and said frame, and handle latch means associated with said handle means adapted to engage said main latch means when the latter is engaged with said platform engaging means for supporting said handle means in a predetermined stationary position.

25. In a truck of the class described having supporting wheel means, a frame carried by said supporting wheel means, and handle means connected to said frame for rotating the same, the combination therewith of platform engaging means pivotally mounted on said frame and adapted to be positioned in an operative position of engaging and raising a platform or the like by rotation of said frame by manipulation of said handle means, main latch means pivotally mounted on said wheel supporting means adapted to engage said platform engaging means in its operative position to prevent pivotal movement of the latter and said frame, handle latch means associated with said handle means adapted to engage said main latch means when the latter is engaged with said platform engaging means for supporting said handle means in a predetermined stationary position, and means carried by said handle means for releasing said handle latch means from engagement with said main latch means.

ARTHUR M. BARRETT.

REFERENCES CITED

The following references are of record in the file of this patent:

UNITED STATES PATENTS

| Number | Name | Date |
|---|---|---|
| 2,190,953 | Smith | Feb. 20, 1940 |
| 2,266,399 | Quayle | Dec. 16, 1941 |